(12) United States Patent
Zeng et al.

(10) Patent No.: US 10,574,782 B2
(45) Date of Patent: *Feb. 25, 2020

(54) METHOD AND SERVER FOR GENERATING CONTACT RELATIONSHIP DATA IN NETWORK COMMUNICATION SYSTEM

(71) Applicant: TENCENT TECHNOLOGY (SHENZHEN) COMPANY LIMITED, Shenzhen (CN)

(72) Inventors: Lei Zeng, Shenzhen (CN); Liang Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 84 days.

This patent is subject to a terminal disclaimer.

(21) Appl. No.: 15/801,835

(22) Filed: Nov. 2, 2017

(65) Prior Publication Data

US 2018/0146066 A1 May 24, 2018

Related U.S. Application Data

(63) Continuation of application No. 14/267,847, filed on May 1, 2014, now Pat. No. 9,838,501, which is a (Continued)

(30) Foreign Application Priority Data

Nov. 4, 2011 (CN) .......................... 2011 1 0344931

(51) Int. Cl.
*H04L 29/08* (2006.01)
*G06Q 10/10* (2012.01)
*G06Q 50/00* (2012.01)

(52) U.S. Cl.
CPC .......... *H04L 67/306* (2013.01); *G06Q 10/10* (2013.01); *G06Q 50/01* (2013.01); *H04L 67/22* (2013.01)

(58) Field of Classification Search
CPC ............ G06Q 10/10–107; H04L 67/22; H04L 67/306; H04L 12/581; H04L 12/6418
See application file for complete search history.

(56) References Cited

U.S. PATENT DOCUMENTS 7,146,570 B2 12/2006 Yeh et al.
8,407,311 B1 * 3/2013 Behforooz .............. H04L 51/04
 709/217

(Continued)

FOREIGN PATENT DOCUMENTS

CN 101175051 A 5/2008
CN 101237426 A 8/2008
(Continued)

*Primary Examiner* — Hitesh Patel
(74) *Attorney, Agent, or Firm* — Anova Law Group, PLLC

(57) ABSTRACT

A method and an apparatus for generating contact relationship data in a network communication system are disclosed. The method includes: selecting target users from contacts of an introducer according to a selecting instruction; sending an introducing request to each of user accounts of the target users; monitoring response instructions from the user accounts of the target users, and generating contact relationship data between the user accounts of the target users after detecting that all the user accounts of the target users return response instructions for accepting the introducing request. The apparatus comprises: a target user selecting module, a request sending module, a response monitoring module, and a contact relationship data generating module. Using the present invention, the convenience and success rate of generating contact relationship data is improved.

14 Claims, 6 Drawing Sheets

Related U.S. Application Data continuation of application No. PCT/CN2012/083010, filed on Oct. 16, 2012.

(56) References Cited

U.S. PATENT DOCUMENTS

| | | |
|---|---|---|
| 2003/0014487 A1 | 1/2003 | Lwakawa et al. |
| 2008/0250332 A1* | 10/2008 | Farrell .................. G06Q 10/10 715/753 |
| 2009/0070684 A1 | 3/2009 | Aldrich et al. |
| 2009/0077244 A1 | 3/2009 | Trang et al. |
| 2009/0172112 A1* | 7/2009 | Denner .................. H04L 51/04 709/206 |
| 2009/0177741 A1 | 7/2009 | Tian |
| 2010/0153278 A1 | 6/2010 | Farsedakis |
| 2011/0289574 A1 | 11/2011 | Hull et al. |
| 2013/0275507 A1 | 10/2013 | Liu |
| 2014/0244760 A1* | 8/2014 | Zeng .................... H04L 67/306 709/204 |

FOREIGN PATENT DOCUMENTS

| | | |
|---|---|---|
| CN | 101968818 A | 2/2011 |
| CN | 101976263 A | 2/2011 |
| CN | 201957051 U | 8/2011 |
| WO | 2013064013 A1 | 5/2013 |

\* cited by examiner

METHOD AND SERVER FOR GENERATING CONTACT RELATIONSHIP DATA IN NETWORK COMMUNICATION SYSTEM

CROSS REFERENCE TO RELATED APPLICATIONS

The application is a continuation application of U.S. patent application Ser. No. 14/267,847, filed on May 1, 2014 and now U.S. Pat. No. 9,838,501 issued on Dec. 5, 2017. U.S. patent application Ser. No. 14/267,847 (now U.S. Pat. No. 9,838,501) is a U.S. continuation application under 35 U.S.C. § 111(a) claiming priority under 35 U.S.C. §§ 120 and 365(c) to International Application No. PCT/CN2012/083010 filed on Oct. 16, 2012, which claims the priority benefit of CN patent application serial No. 201110344931.X, titled "method and device for generating contact relationship data in network communication system" and filed on Nov. 4, 2011, the contents of which are incorporated by reference herein in their entirety for all intended purposes.

TECHNICAL FIELD

The present invention relates to network communication fields, and more particularly to a method and an apparatus for generating contact relationship data in a network communication system.

BACKGROUND

Currently, with the development of network communication technologies, network communication systems for various segment fields are developed, and these systems satisfy special communication requirements of users in the segment fields.

Currently the most popular network communication systems, for example, include the social network service (SNS) system and the instant message (IM) systems. SNS is an internet service system dedicated to help people to create a social network. IM system is a service system that can send and receive data services such as internets messages instantly.

With the development of network communication systems, the main function thereof gradually changes from the original basic communication functions to social functions. Currently almost all the network communication systems are expanding their convenience in social functions, in other words, by improving the information processing methods of these network communication systems, letting the user is capable of getting the contact information of the people may be known by the user in a more convenient way, creating a social circle on the network in a more convenient way, and expanding their network social circle in a more convenient way.

In the existing network communication systems that having social functions, each user has a number of contacts such as friends, classmates and families, and the user introducing one contact thereof to another is a common method for expanding social circles. However, in the existing network communication systems, generating a contact relationship between strangers by the introduction of a common fried can only achieved by adding contacts. Generally, according to such a method both target users need to interact with an introducer for obtaining account information and introduction of the other user; if one of the target users would like to accept the introducing, in other words, he would like to add the other user as a contact, an existing process for adding contacts is executed. That is, a contact adding request is sent to the other user; if the other user accepts the request, the network communication system generates a contact relationship data between the two users, and the two users can communicate with each other as contacts.

However, in the method of generating a contact relationship between the strangers by the introduction of the common fried, the network communication system only offers little information, and the relationship information of the target user and the introducer is not reflected in the information stream of the contact adding operation. Thus, the success rate of the two target users becoming friends is low. If the target users want to confirm that the other user is target by a common friend, the target users have to communicate with the introducer to confirm the relationship of the other user and the introducer, and this process remarkably increases the number of human-machine interactions. The operations is not only complex, but also each human-machine interaction would trigger a computing process and produce response results. As a result, a lot of resources of machine side (including clients, network servers, network bandwidth, and etc.) are occupied.

SUMMARY

In one embodiment, a method for generating contact relationship data in a network communication system includes the following steps: selecting at least two target users from contacts of an introducer according to a selecting instruction; sending an introducing request to user accounts of the target users; monitoring response instructions from the user accounts of the target users, and generating contact relationship data between the user accounts of the target users after detecting that all the user accounts of the target users return response instructions for accepting the introducing request.

In one embodiment, a server for generating contact relationship data in a network communication system is provided, the server includes: a network adapter; a receiving module configured for receiving a selection instruction from a client via the network adapter; a selecting module configured for selecting target users from contacts of an introducer according to the selecting instruction; a request sending module configured for sending an introducing request to user accounts of the target users; a response monitoring module configured for monitoring response instructions from the user accounts of the target users, and a generating module configured for generating contact relationship data between the user accounts of the target users after detecting that all the user accounts of the target users return response instructions for accepting the introducing request.

In one embodiment, a computer readable storage medium storing one or more programs is provided. The one or more programs comprising instructions, which when executed by a server in a network communication system, cause the server to perform a method including the following steps: selecting at least two target users from contacts of an introducer according to a selecting instruction; sending an introducing request to user accounts of the target users; monitoring response instructions from the user accounts of the target users, and generating contact relationship data between the user accounts of the target users after detecting that all the user accounts of the target users return response instructions for accepting the introducing request.

According to above method and server, a method for generating contact relationship between strangers via introducing of an introducer. The system sends an introducing request to the target users automatically, and determines whether to generate contact relationship data representing that the target users are contacts of each other according to response instructions from the target users, so that the convenience and success rate of generating contact relationship data between strangers is improved.

The above description is only an overview of the technical solutions of the present invention. In order to understand the technical solutions of the present invention more clearly, implement the technical solutions of the present invention according to the following specification, and make the purpose, the characteristics, and the advantages of the present invention more easily to understand, hereinafter, combined with accompanying drawings, embodiments of the present invention are described as follows.

DETAILED DESCRIPTION OF PREFERRED EMBODIMENTS

The present invention will now be described more specifically with reference to the following embodiments. Hereinafter, combined with the accompanying drawings of the embodiments of the present invention, the purpose, technical solutions and advantages of the embodiments of the present invention are clearly and fully described as follows.

The aforementioned and other technical solutions, features and utilities of the present invention will be clearly shown in the following detailed description of preferred embodiments accompanying with the drawings. According to the description of the embodiments, the intended purpose, the employed technical solutions and the advantages of the present invention will be understood more deeply and concretely. However, it is to be noted that the accompanying drawings are presented herein for purpose of illustration and description only, and it is not intended to limit the present invention.

Figure 1:
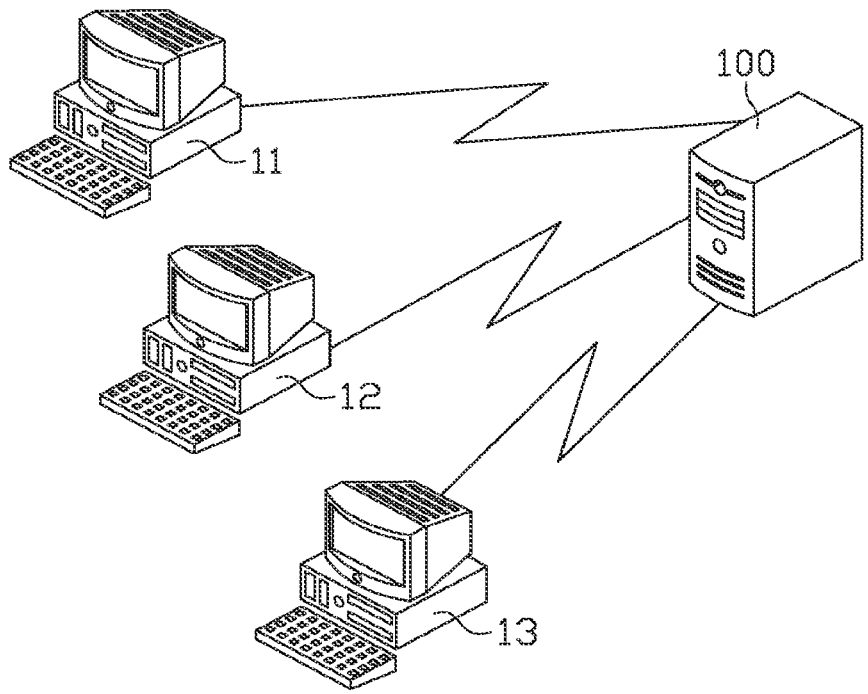
FIG. 1 is a schematic view of a network communication system according to an embodiment.

FIG. 1 is a schematic view of a network communication system according to an embodiment. As shown in FIG. 1, a first client 11, a second client 12, and a third client 13 are connected to a server 100 of the network communication system via a network connection. Examples of the client include, but not limited to, desktop computers, laptop computers, tablet computers, mobile phones. Each of the first client 11, the second client 12 and the third client 13 installs a communication application such as an instant messaging application therein. Three different users could login the server 100 using three user accounts, respectively.

Figure 3A:
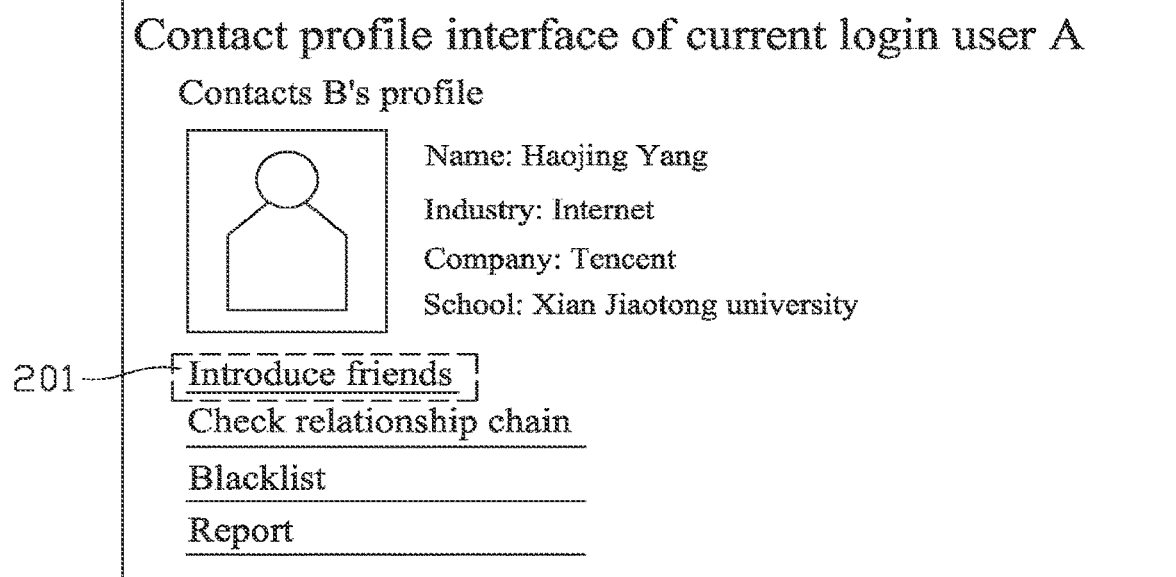
FIG. 3a is a schematic diagram showing a contact profile interface according to an embodiment.

Except the normal functionalities, the communication application further provides a friend introducing ability. For example, as shown in FIG. 3a, in a contact profile interface provided by the communication application, an interface object 201 for launching a friend introducing process for the user related to the contact profile interface is included. The interface object 201, for example, is a button, a link, or a text, which when clicked by a user, launches the friend introducing process.

Figure 3B:
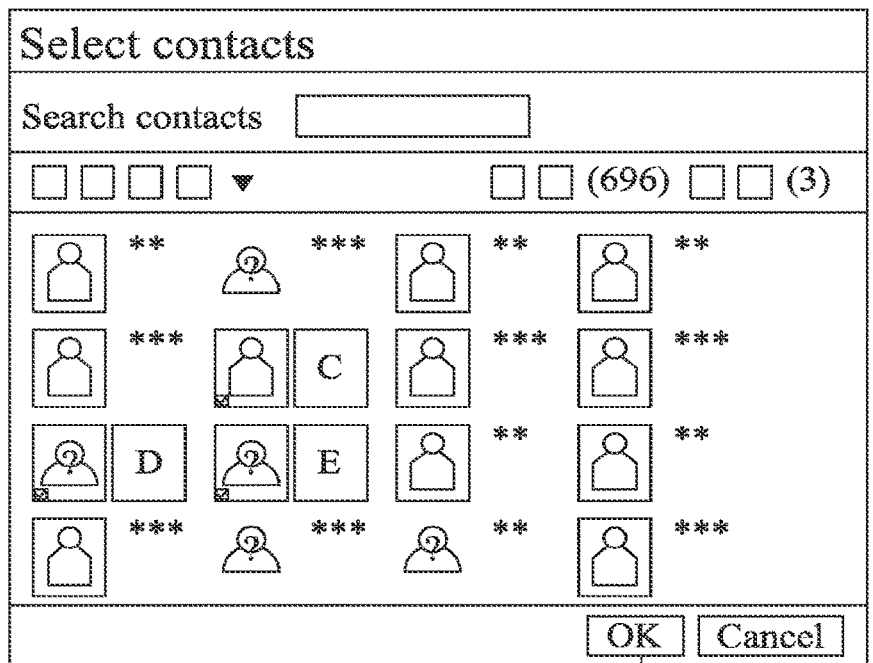
FIG. 3b is a schematic diagram showing a contact selecting interface according to an embodiment.

In one embodiment, after the interface object 201 is triggered (e.g., clicked), a contact selecting interface is displayed, as shown in FIG. 3b. In the contact selecting interface, contacts of an introducer could be listed for selection. For example, each contact has a check box at a side of a portrait of the contact. By checking the check box, a corresponding contact could be selected by the introducer. In addition, an interface object 202 can be included in the contact selecting interface. The interface object 202 is a trigger of sending a selection instruction to the server 100. In the present embodiment, the interface object 202 is a button, which when clicked by the introducer starts the process of sending the selection instruction to the server 100. The selection instruction contains information of which user are selected by the introducer. After the selection instruction is sent to the server 100, accordingly, the server 100 receives the selection instruction. The server side process for the friend introducing is started.

Figure 6:
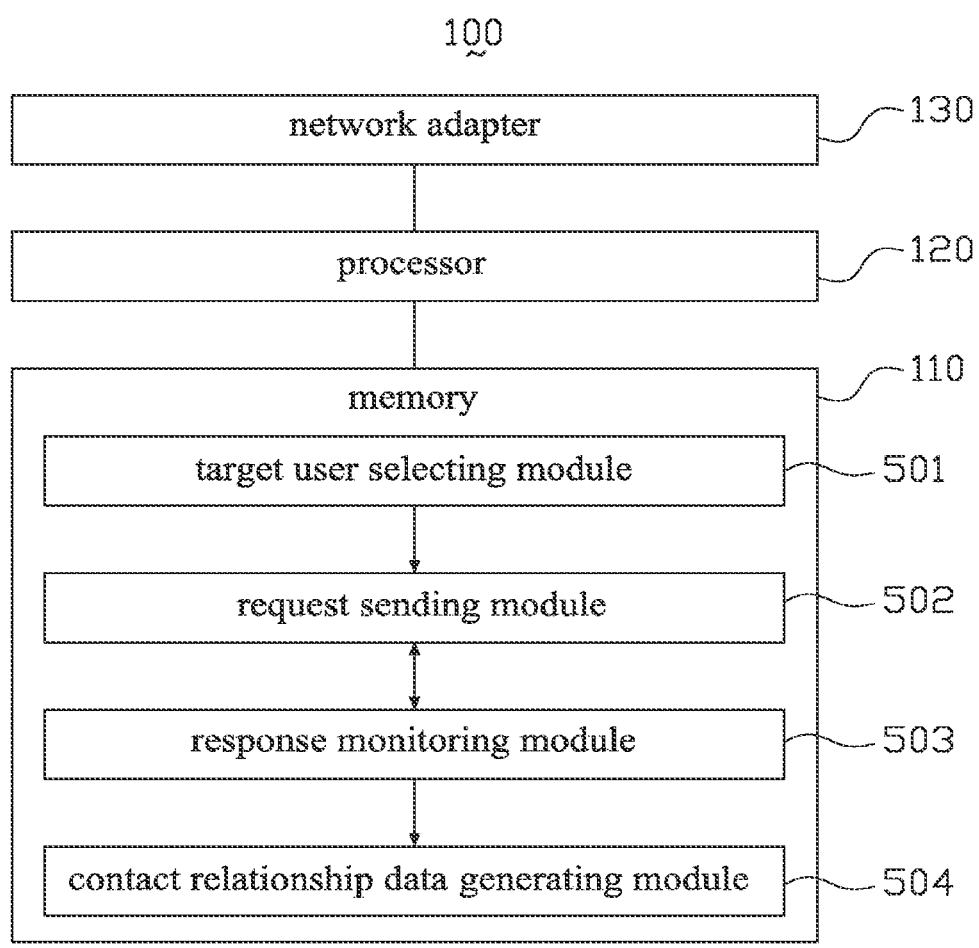
FIG. 6 is a block diagram of a server according to an embodiment.

Referring to FIG. 6, the server 100 includes memory 110, one or more processors 120, and a network adapter 130. The memory 110 may include high speed random access memory and may also include non-volatile memory, such as one or more magnetic disk storage devices, flash memory devices, or other non-volatile solid state memory devices. In some embodiments, the memory 100 may further include storage remotely located from the one or more processors 120, for instance network attached storage accessed via network adapter 130 and a communications network (not shown) such as the Internet, intranet(s), Local Area Networks (LANs), Wireless Local Area Networks (WLANs), Storage Area Networks (SANs) and the like, or any suitable combination thereof.

In some embodiments, there are software components stored in the memory 100, for example, the software components for performing the method of generating contact relationship data in the network communication system. The software components will be described in the following context.

Figure 2:
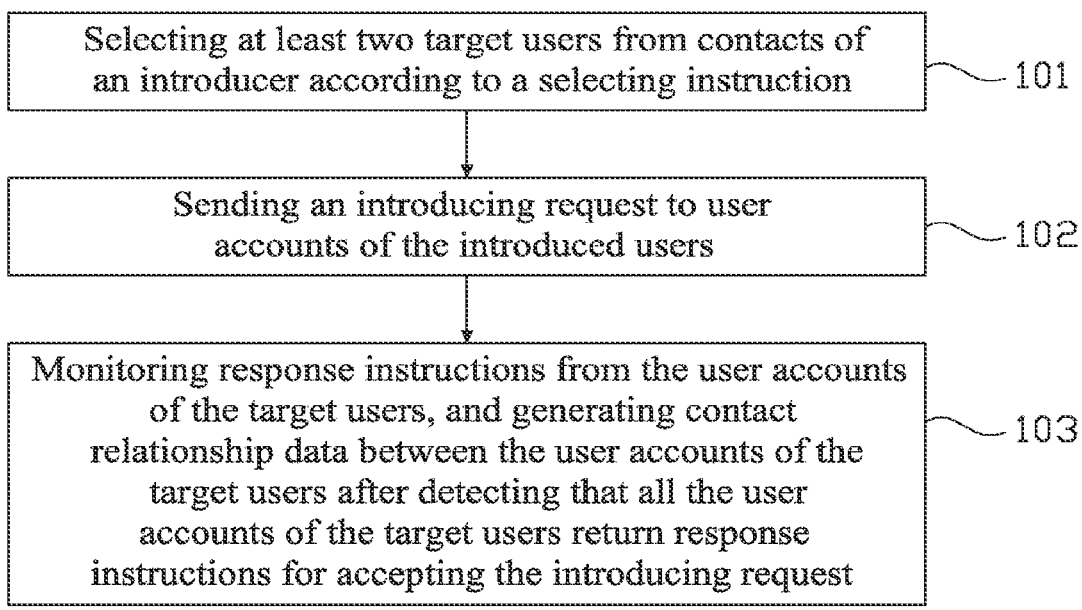
FIG. 2 is a flowchart of a method of generating contact relationship data according to an embodiment.

FIG. 2 is a flowchart of a method of generating contact relationship data according to an embodiment. Referring to FIG. 2, the flow includes the following steps:

Step 101: selecting at least two target users from contacts of an introducer (that is, the current login user) according to a selecting instruction.

Step 102: sending an introducing request to user accounts of the target users.

Step 103: monitoring response instructions from the user accounts of the target users, and generating contact relationship data between the user accounts of the target users after detecting that all the user accounts of the target user return response instructions for accepting the introducing request.

FIG. 3a and FIG. 3b are schematic diagrams showing an operation that the introducer selects the target users from the contacts thereof according to an implementing example of the step 101. Referring to FIG. 3a, an interface object "introduce friends" 201 is shown in a contact profile interface (assuming that the contact is B) of a current login user (assuming that the current login user is A). When the system detects that the interface object 201 is clicked, a contact selecting interface of the current login user is displayed, as shown in FIG. 3b. The contact selecting interface includes a contact list of the current login user, the contact list is configured to be selected by the current login user. The current login user can select one or more contacts from the contact list, and introduce the selected contacts to the contact B. When the system detects that the current login user already select one or more contacts and an interface object, such as a button 202 is clicked, the current login user is defined as the introducer, and the selected contacts in FIG. 3b will be target to the contact B.

No matter how many contacts are selected for the contact B by the introducer, the network communication system of the present invention executes the method of the present invention for the contact B and each of the target users. For example, the current login user selects a contact C, a contact D and a contact E, as shown in the FIG. 3b, the network communication system defines the contact B and contact C as a pair of target users, defines the contact B and contact D as a pair of target users, and defines the contact B and contact E as a pair of target users, and then executes the method of the present invention for each pair of target users. In the following embodiment, the present invention is described taking a process of generating contact relationship data between the contact B and contact C as an example.

Of course, there are a variety of ways to select the target users from the contacts of the introducer according to the selecting instruction in the present invention. For example, the current login user can select two contacts from the contact list of the introducer, and then the network communication system defines the two selected contacts as a pair of target users to execute the method of the present invention.

Figure 4:
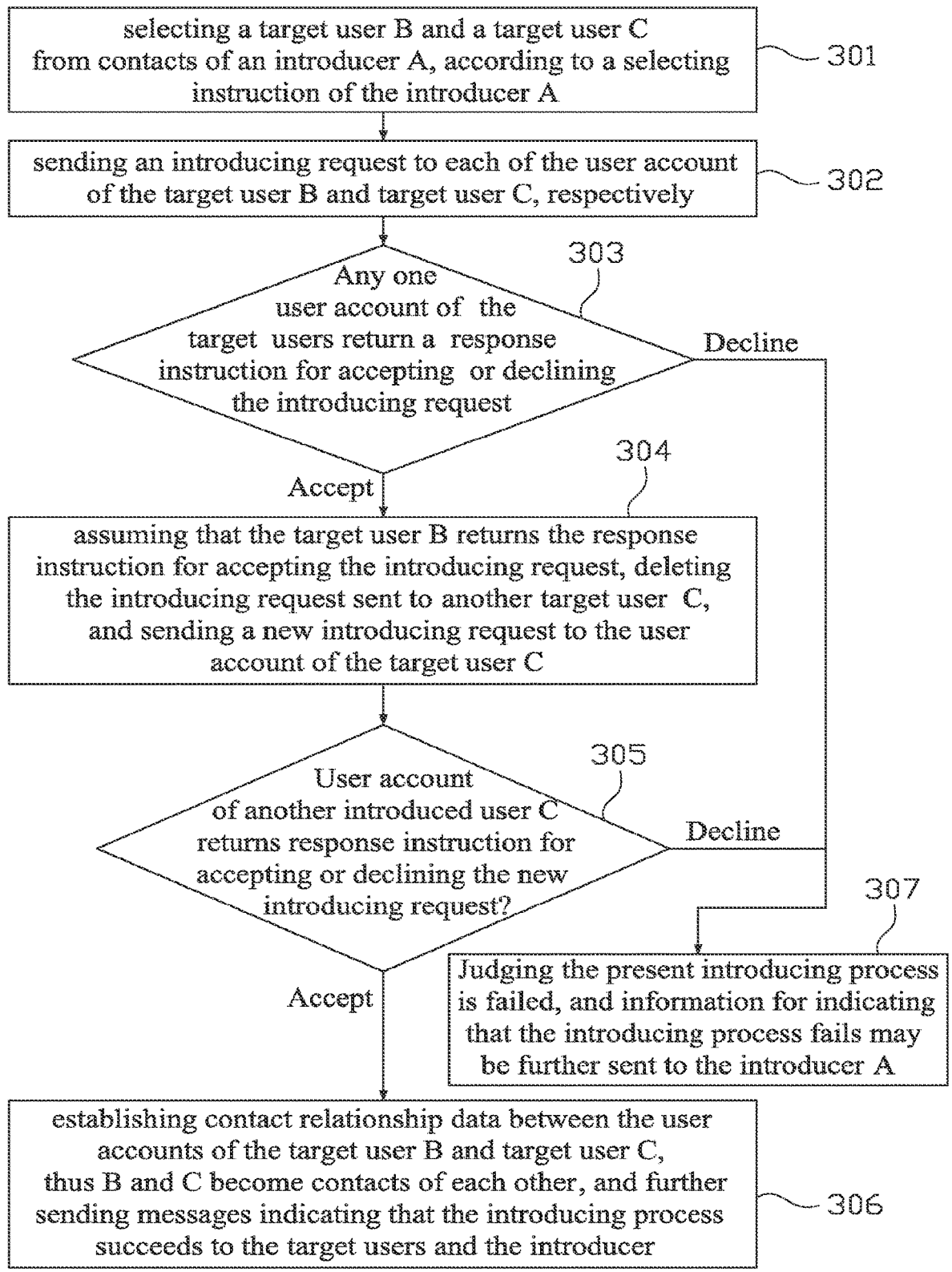
FIG. 4 is a flowchart of a method of generating contact relationship data according to another embodiment.

FIG. 4 is a flowchart of a method of generating contact relationship data according to another embodiment. Referring to FIG. 4, the method includes following steps:

Step 301: selecting a target user B and a target user C from contacts of an introducer A, according to a selecting instruction of the introducer A.

Step 302: sending an introducing request to each of the user account of the target user B and target user C, respectively. The introducing request may be a system message.

Figure 5A:
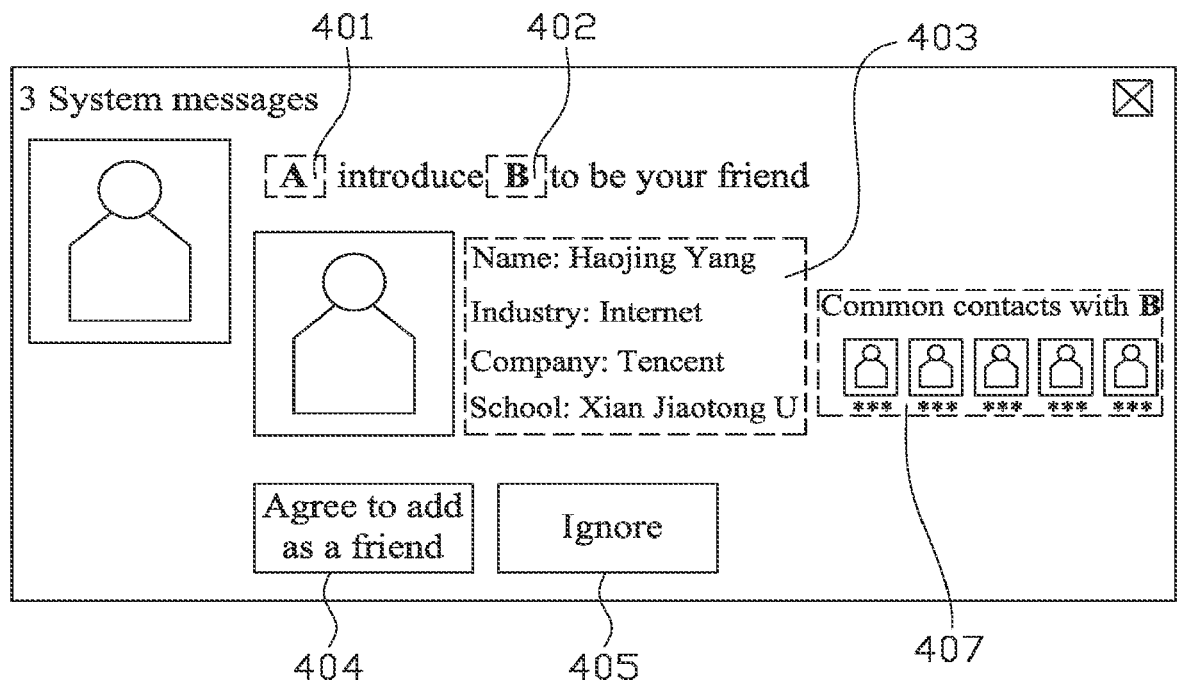
FIG. 5a is an interface schematic diagram of an introducing request sent to both the target users.

FIG. 5a is an interface schematic diagram of an introducing request sent to both the target users. Referring to FIG. 5a, assuming that the introducing request is sent to the target user C, the introducing request may include a name 401 of the introducer A, a name 402 and a brief introduction 403 of the target user B, and interface object for accepting the introducing request or not. The interface object includes interface object 404 (e.g., a button tagged "agree to add as a friend" shown in FIG. 5a) for accepting the introducing request, and interface object 405 (i.e., "ignore" shown in FIG. 5a) for declining the introducing request. The brief introduction 403 of the target user B may include a head portrait, a name, an industry, a company, and a school of the target user B. The introducing request received by the target user B is similar to the introducing request in the FIG. 5a. Therefore, one target user could intuitively know the detail information of the other target user according to the received introducing request, and the introducing request also confirms that the introducer and the other target user are known to each other (because the introducing request is a system message, but not a message from a user). As a result, the success rate of the introducing process is improved.

The introducing request in the FIG. 5a may further include intersection information 407 of the contacts of the target user C and the contacts of the target user B, in other words, include contacts known by both the target users B and C. In this way, the target users can learn more about each other, thus the success rate of the introducing process is further improved. The target user may further click a certain user in the intersection information to add the user as a friend. In this way, the social circle is further expanded.

Step 303: monitoring whether the user accounts of the target users returns response instructions for accepting the introducing request (by clicking "agree to add as a friend" shown in FIG. 5a), or the user accounts of the target users returns response instructions for declining the introducing request (by clicking "ignore" shown in FIG. 5a). If any one of the target users returns the response instruction for accepting the introducing request, a step 304 is executed. If any one of the target users returns the response instruction for declining the introducing request, a step 307 is executed.

Step 304: assuming that the target user B returns the response instruction for accepting the introducing request, deleting the introducing request sent to the other target user (that is the target user C), and sending a new introducing request to the user account of the target user C.

Figure 5B:
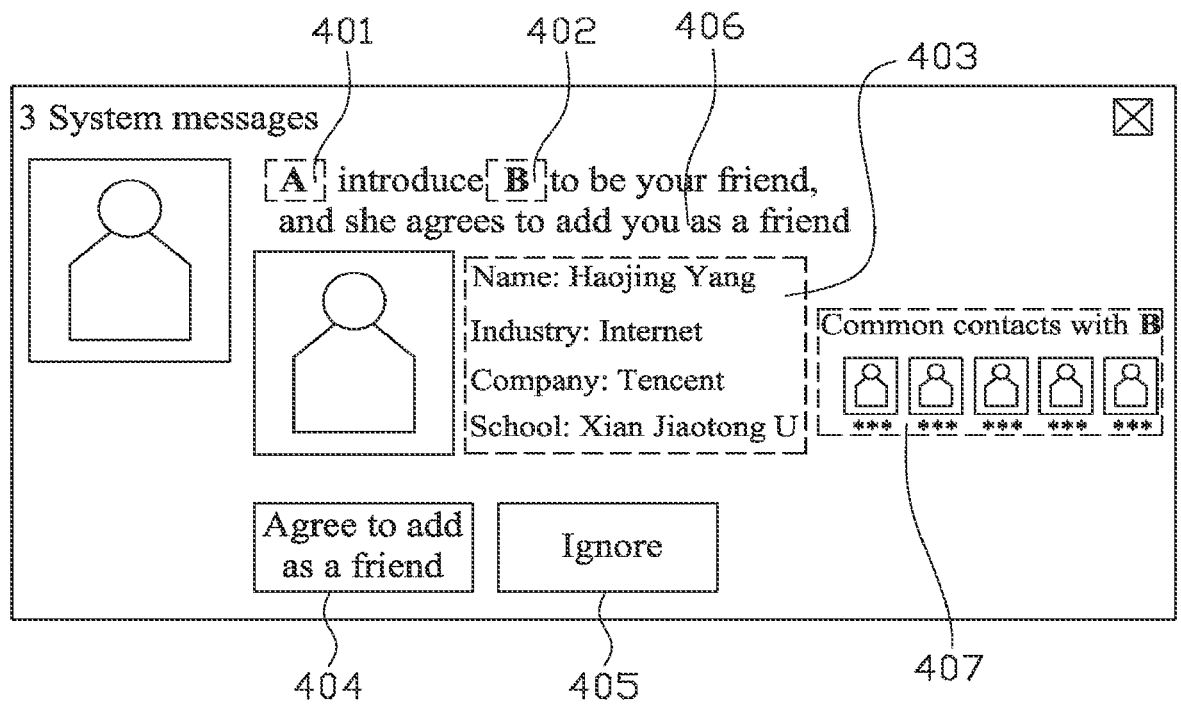
FIG. 5b is an interface schematic diagram of a new introducing request sent to one target user when the other target user accepts the introducing request.

FIG. 5b is an interface schematic diagram of a new introducing request sent to one target user when the other target user accepts the introducing request. Referring to FIG. 5b, the new introducing request sent to the target user C may include the name 401 of the introducer A, the name 402 of the other target user B, prompt information 406 (e.g., "she has already agree to add you as her friend" shown in the figure) indicating that the target user B has already accepted the introducing request, the brief introduction 403 of the target user B, and the interface object for accepting the introducing request or not. The interface object includes interface object 404 (e.g., a button tagged "agree to add as a friend" shown in FIG. 5b) for accepting the introducing request, and interface object 405 (e.g., "ignore" shown in FIG. 5b) for declining the introducing request. The brief introduction 403 of the target user B may include a head portrait, a name, an industry, a company, and a school of the target user B.

The introducing request in the FIG. 5b may further include intersection information 407 of the contacts of the target user C and the contacts of the target user B, in other words, include contacts known by both the target users B and C. In this way, the target users can learn more about each other, thus the success rate of the introducing process is further improved. The target user may further click a certain user in the intersection information to add the user as a friend. In this way, the social circle is further expanded.

In addition, the step 304 may be an optional step. A step 305 can be executed directly after detecting that any one target user returns a response instruction for accepting the introducing request in the step 303.

Step 305: monitoring whether the user account of the other target user C returns a response instruction for accepting the new introducing request or not. If the user account of the other target user C returns a response instruction for accepting the new introducing request, a step 306 is executed. If the user account of the other target user C returns a response instruction for declining the new introducing request, the step 307 is executed.

Step 306: generating contact relationship data between the user accounts of the target user B and target user C, thus B and C become contacts of each other, and the introducing process is ended.

The step 306 may further send messages indicating that the introducing process succeeds to the target users and the introducer. Specifically, the messages may be sent to the target user B and the introducer A, or be sent to the both the target users B and C, and the introducer A.

Figure 5C:
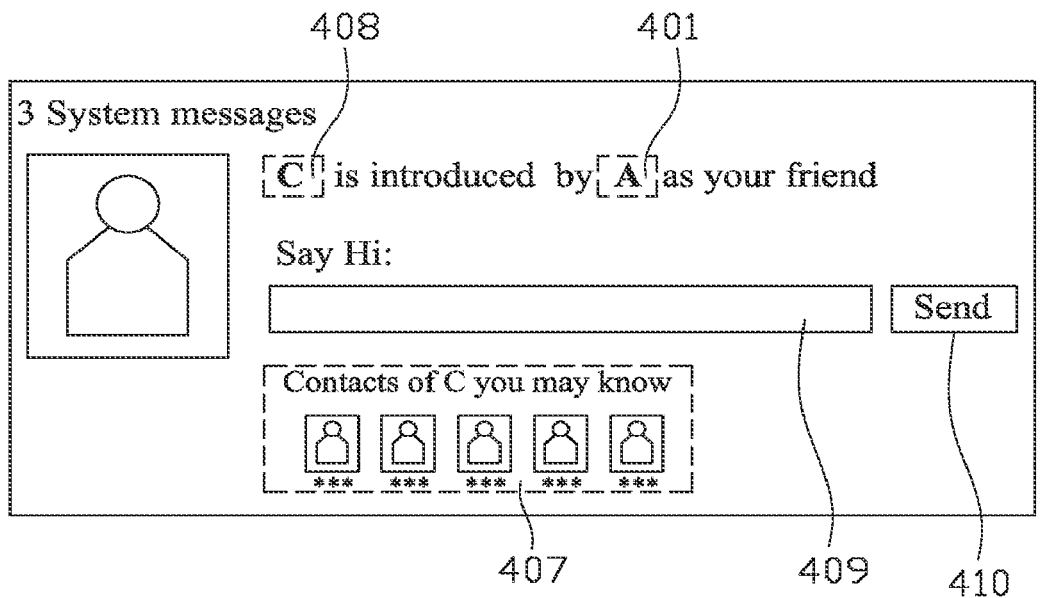
FIG. 5c is an interface schematic diagram of a message sent to the target users showing that the introducing process succeeds.

FIG. 5c is an interface schematic diagram of a message sent to the target users showing that the introducing process succeeds. Referring to FIG. 5c, assuming that the message is sent to the target user B, the message may include the name 401 of the introducer A, the name 408 of the other target user C, an information inputting box 409 and an information sending trigger 410 (such as a "send" button in the figure) of the information inputting box 409. The information shown in FIG. 5c may further include intersection information 407 of the contacts of the target user B and the contacts of the target user C, in other words, include contacts known by both the target users B and C. In this way, the target user may further click a certain user in the intersection information to add the user as a friend. Accordingly, the social circle is further expanded.

Figure 5D:
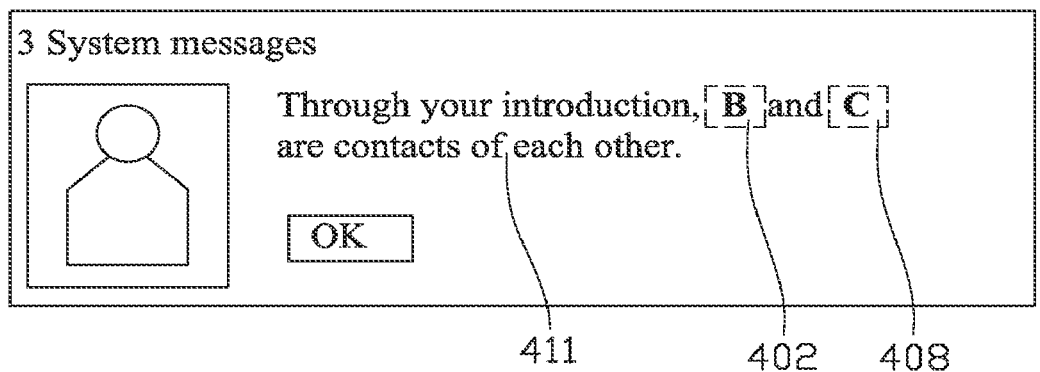
FIG. 5d is an interface schematic diagram of a message sent to the introducer showing that the introducing process succeeds.

FIG. 5d is an interface schematic diagram of a message sent to the introducer showing that the introducing process succeeds. Referring to FIG. 5d, the information sent to the introducer A at least includes the name 402 of the target user B, the name 408 of the target user C and prompt information 411 indicating that the introducing process succeeds.

Step 307: if detecting that at least one user account returns a response instruction for declining the introducing request, the present introducing process is failed, and information for indicating that the introducing process fails may be further sent to the introducer.

Figure 5E:
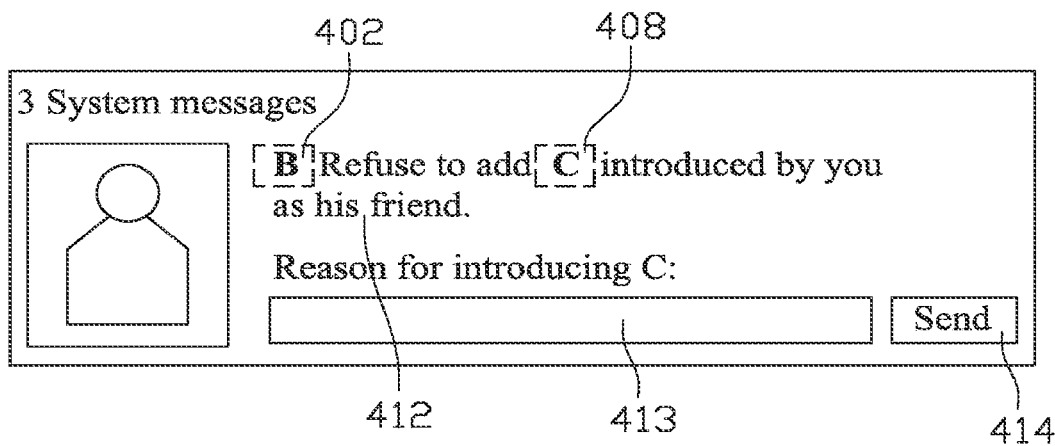
FIG. 5e is an interface schematic diagram of a message sent to the introducer showing that the introducing process fails.

FIG. 5e is an interface schematic diagram of a message sent to the introducer showing that the introducing process fails. Referring to FIG. 5e, the information at least include the names 402 and 408 of the target users, a reason information 412 for the failure of the introducing process, an information inputting box 413 for sending inputted information to the target user who decline the introducing request, and an information sending trigger 414 of the information inputting box 413.

FIG. 6 is a block diagram of a server in a network communication system according to an embodiment. Referring to FIG. 6, software components stored in the memory 110 includes: a target user selecting module 501, a request sending module 502, a response monitoring module 503 and a contact relationship data generating module 504.

The target user selecting module 501 is configured to select target users from contacts of an introducer according to a selecting instruction.

The request sending module 502 is configured to send an introducing request to user accounts of the target users.

The response monitoring module 503 is configured to monitor response instructions from the user accounts of the target users, and triggering the contact relationship data generating module 504 to generate contact relationship data between the target users after the response monitoring module 503 detects that all the user accounts of the target users return response instructions for accepting the introducing request.

In one implementing example, the introducing request sent to the user accounts of the target users by the request sending module 502 includes the name of the introducer, the name and brief introduction of the other target user, and interface object for accepting or declining the introducing request, as shown in the FIG. 5a.

In one implementing example, the response monitoring module 503 is further configured to notify the request sending module 502 after detecting that any one of the user accounts of the target users returns a response instruction for accepting the introducing request. The request sending module 502 is further configured for: after receiving a notification from the response monitoring module 503, deleting the introducing request sent to the other target user, and sending a new introducing request to the other target user. As shown in FIG. 5b, the new introducing request may include the name of the introducer, the name of the other target user, prompt information indicating that the other target user has already accepted the introducing request, brief introduction of the other target user, and interface object for accepting the new introducing request or not.

In one implementing example, the response monitoring module 503 is further configured to notify the request sending module 502 after detecting that all the user accounts of the target users return respond instructions for accepting the introducing request. The request sending module 502 is further configured for: sending information indicating that the introducing process succeeds to the target users after receiving a notification from the response monitoring module 503. As shown in FIG. 5c, the information includes the name of the introducer, the name of the other target user, an information inputting box and an information sending trigger of the information inputting box.

The information sent to the target users by the request sending module 502 may further include intersection information of contacts of the target user and contacts of the other contacts, as shown in FIG. 5a, FIG. 5b and FIG. 5c.

In one implementing example, the response monitoring module 503 is further configured to notify the request sending module 502 after detecting that all the user accounts of the target users return response instructions for declining the introducing request. The request sending module 502 is further configured for sending information indicating that the introducing process fails to the user account of the introducer after receiving a notification from the response monitoring module 503. As shown in FIG. 5e, the information at least include the names of the target users, a reason information for the failure of the introducing, an information inputting box for sending inputted information to the target user who decline the introducing request, and an information sending trigger of the information inputting box.

In one implementing example, the response monitoring module 503 is further configured to notify the request sending module 502 after detecting that all the user accounts of the target users return respond instructions for accepting the introducing request. The request sending module 502 is further configured for sending information indicating that the introducing process succeeds to the target users after receiving a notification from the response monitoring module 503. As shown in FIG. 5d, the information at least includes names of the target users, and prompt information indicating that the introducing process succeeds.

The above descriptions are only preferred embodiments of the present invention, and are not intended to limit the present invention. Any one of ordinarily skilled in the art would make replacements or modifications to the above technical solutions within the spirit and the scope of the present invention to obtain equivalent embodiments, and these equivalent embodiments should also be included in the scope of the present invention.

INDUSTRIAL PRACTICITY

The present invention provides a method for generating a contact relationship between strangers via introducing of an introducer. The system sends an introducing request to the target users automatically, and determines whether to generate relationship data representing that the target users are contacts of each other according to respond instructions of the target users so that the convenience and success rate of generating contact relationship data between strangers is improved.

What is claimed is:

1. A method for establishing contact relationship of online user accounts in a network communication system, the method comprising:
selecting, by a server of the network communication system, first and second target users from contacts of an introducer according to a selecting instruction from a terminal of the introducer;
sending, by the server, first and second introducing requests respectively to first and second user accounts respectively of the first and second target users, wherein: the first and second introducing requests are each presented as a system message on respective user terminals of the first and second target users; and the presented system message includes a list of common contacts associated with the respective first and second user accounts of the first and second target users, information of the introducer, and a clickable option to accept or decline;
monitoring, by the server, response instructions from the first and second user accounts;
after detecting that the first user account returns a response instruction of acceptance:
facilitating, by the server, removal of presentation of the second introducing request from a device interface associated with the second user account; and
facilitating, by the server, presentation on the device interface an updated second introducing request, the updated second introducing request including a brief introduction of the first target user, prompt information indicating that the first target user has agreed to befriend the second target user, and a trigger to respond, wherein availability of the device interface presenting system message indicating the updated second introducing request along with the removal of presentation of the second introducing request avoids a need of the second target user to communicate back and forth with the introducer regarding information and status update on the first target user so as to reduce unnecessary human-machine interactions;
sending, by the server, information indicating that an introducing process succeeds to the first user account of the contacts of the introducer; and
generating, by the server, contact relationship data between the first and second user accounts if the second user account also returns a response instruction of acceptance; and after detecting that at least one of the first and second user accounts returns a response instruction of declining:
sending, by the server, information indicating that the introducing process fails to the at least one of the first and second user accounts of the contacts of the introducer.

2. The method according to claim 1, wherein the information indicating that the introducing process fails at least includes: a name of the at least one of the first and second target users who has declined, reason information showing why the introducing process fails, an information inputting box for the introducer to input reasons for introducing, and a trigger for sending an update on content received by the information inputting box.

3. The method according to claim 1, wherein the information indicating that the introducing process succeeds at least includes name of the first target user, and prompt information indicating that the introducing process succeeds.

4. The method according to claim 1, wherein: the first introducing request sent to the first user account of the first target user includes a name of the introducer, a name and a brief introduction of the second target user, and a trigger for sending a response instruction for accepting or declining the introducing request.

5. The method according to claim 1, further comprising:
identifying, a third target user from contacts of the introducer;
sending, by the server, a third introducing request to the third target user referencing the first or the second target user as a friend to connect; and
monitoring a response instruction from a third user account associated with the third target user.

6. A server for establishing contact relationship of online user accounts in a network communication system, comprising: a network adapter; a memory; and a processor coupled to the memory, the memory storing software instructions which when executed by the processor, configure the processor for:
receiving a selection instruction from a terminal of an introducer via the network adapter;
selecting first and second target users from contacts of an introducer according to the selecting instruction from the terminal of the introducer;
sending first and second introducing requests to first and second user accounts respectively of the first and second target users, wherein: the first and second introducing requests are each presented as a system message on respective user terminals of the first and second target users; and the presented system message includes a list of common contacts associated with the first and second user accounts of the first and second target users, information of the introducer, and a clickable option to accept or decline;
monitoring response instructions from the first and second user accounts;
after detecting that the first user account returns a response instruction of acceptance:
facilitating removal of presentation of the second introducing request from a device interface associated with the second user account; and
facilitating presentation on the device interface an updated second introducing request, the updated second introducing request including a brief introduction of the first target user, prompt information indicating that the first target user has agreed to befriend the second target user, and a trigger to respond, wherein availability of the device interface presenting system message indicating the updated second introducing request along with the removal of presentation of the second introducing request avoids a need of the second target user to communicate back and forth with the introducer regarding information and status update on the first target user so as to reduce unnecessary human-machine interactions;

sending information indicating that an introducing process succeeds to the first user account of the introducer;

generating contact relationship data between the first and second user accounts if the second user account also returns a response instruction of acceptance; and after detecting that at least one of the first and second user accounts returns a response instruction of declining:

sending information indicating that the introducing process fails to the at least one of the first and second user accounts of the introducer.

7. The server according to claim 6, wherein the information indicating that the introducing process fails at least comprises: a name of the at least one of the first and second target users who has declined, reason information showing why the introducing process fails, an information inputting box for the introducer to input reasons for introducing, and a trigger for sending an update on content received by the information inputting box.

8. The server according to claim 6, wherein the information indicating that the introducing process succeeds at least includes name of the first target user, and prompt information indicating that the introducing process succeeds.

9. The server according to claim 6, wherein: the first introducing request sent to the first user account of the first target user includes a name of the introducer, a name and a brief introduction of the second target user, and a trigger for sending a response instruction for accepting or declining the introducing request.

10. A non-transitory computer readable storage medium storing one or more programs, the one or more programs comprising instructions, which when executed by a server in a network communication system, cause the server to perform a method for establishing contact relationship of online user accounts, the method including:

selecting first and second target users from contacts of an introducer according to a selecting instruction from a terminal of the introducer;

sending first and second introducing requests respectively to first and second user accounts respectively of the first and second target users, wherein: the first and second introducing requests are each presented as a system message on respective user terminals of the selected target users; and the presented system message includes a list of common contacts associated with the respective first and second user accounts of the first and second target users, information of the introducer, and a clickable option to accept or decline;

after detecting that the first user account returns a response instruction of acceptance:

facilitating, by the server, removal of presentation of the second introducing request from a device interface associated with the second user account; and facilitating, by the server, presentation on the device interface an updated second introducing request, the updated second introducing request including a brief introduction of the first target user, prompt information indicating that the first target user has agreed to befriend the second target user, and a trigger to respond, wherein availability of the device interface presenting system message indicating the updated second introducing request along with the removal of presentation of the second introducing request avoids a need of the second target user to communicate back and forth with the introducer regarding information and status update on the first target user so as to reduce unnecessary human-machine interactions;

sending information indicating that an introducing process succeeds to the first user account of the introducer; and generating contact relationship data between the first and second user accounts if the second user account also returns a response instruction of acceptance; and after detecting that at least one of the first and second user accounts returns a response instruction of declining:

sending information indicating that the introducing process fails to the at least one of the first and second user accounts of the introducer.

11. The non-transitory computer readable storage medium according to claim 10, wherein the information indicating that the introducing process fails at least includes: a name of the at least one of the first and second target users who has declined, reason information showing why the introducing process fails, an information inputting box for the introducer to input reasons for introducing, and a trigger for sending an update on content received by the information inputting box.

12. The non-transitory computer readable storage medium according to claim 10, wherein the information indicating that the introducing process succeeds at least includes name of the first target user, and prompt information indicating that the introducing process succeeds.

13. The non-transitory computer readable storage medium according to claim 10, wherein: the first introducing request sent to the first user account of the first target user includes a name of the introducer, a name and a brief introduction of the second target user, and a trigger for sending a response instruction for accepting or declining the introducing request.

14. The non-transitory computer readable storage medium according to claim 10, the method further including:

identifying a third target user from the contacts of the introducer;

sending a third introducing request to the third target user referencing the first or the second target user as a friend to connect; and monitoring a response instruction from a third user account associated with the third target user.

* * * * *